United States Patent
Kim et al.

(10) Patent No.: US 11,600,862 B2
(45) Date of Patent: Mar. 7, 2023

(54) ELECTROLYTE FOR LITHIUM SECONDARY BATTERY, AND LITHIUM SECONDARY BATTERY CONTAINING SAME

(71) Applicant: SAMSUNG SDI CO., LTD., Yongin-si (KR)

(72) Inventors: Yunhee Kim, Yongin-si (KR); Hoseok Yang, Yongin-si (KR); Minyoung Lee, Yongin-si (KR); Sejeong Park, Yongin-si (KR); Hyunwoo Kim, Yongin-si (KR); Sujeong Koh, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 462 days.

(21) Appl. No.: 16/305,092

(22) PCT Filed: May 29, 2017

(86) PCT No.: PCT/KR2017/005595
§ 371 (c)(1),
(2) Date: Nov. 28, 2018

(87) PCT Pub. No.: WO2017/209472
PCT Pub. Date: Dec. 7, 2017

(65) Prior Publication Data
US 2020/0321656 A1 Oct. 8, 2020

(30) Foreign Application Priority Data
Jun. 2, 2016 (KR) .................. 10-2016-0068953

(51) Int. Cl.
*H01M 10/0569* (2010.01)
*H01M 10/0525* (2010.01)
(Continued)

(52) U.S. Cl.
CPC ......... *H01M 10/0569* (2013.01); *C08L 65/02* (2013.01); *H01M 4/131* (2013.01);
(Continued)

(58) Field of Classification Search
CPC ......... H01M 10/0569; H01M 10/0525; H01M 4/131; H01M 2004/021; H01M 2004/027; H01M 2004/028
See application file for complete search history.

(56) References Cited

U.S. PATENT DOCUMENTS

2002/0018940 A1* 2/2002 Nirasawa .......... H01M 10/0567
429/231.95
2004/0053138 A1* 3/2004 Otterstedt .......... H01M 10/0525
429/307

(Continued)

FOREIGN PATENT DOCUMENTS

JP 2002-124298 A 4/2002
JP 2013-012387 A * 1/2013 ........ H01M 10/0567
(Continued)

OTHER PUBLICATIONS

Tu, et al., "Terthiophene as electrolyte additive for stabilizing lithium nickel manganese oxide cathode for high energy density lithium-ion batteries", Electrochimica Acta, vol. 208, pp. 251-259 (2016).
(Continued)

*Primary Examiner* — Osei K Amponsah
(74) *Attorney, Agent, or Firm* — Lee IP Law, P.C.

(57) ABSTRACT

The present invention relates to an electrolyte for a lithium secondary battery, comprising an organic solvent, a lithium salt and a compound of Chemical Formula 1, wherein the
(Continued)

compound of Chemical Formula 1 is contained in an amount of 0.001 wt % or more and less than 0.1 wt %.

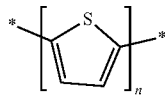

[Chemical Formula 1]

In Chemical Formula 1, n is one of the integers 3 to 10.

8 Claims, 6 Drawing Sheets

(51) Int. Cl.
 H01M 4/131 (2010.01)
 C08L 65/02 (2006.01)
 H01M 4/02 (2006.01)
(52) U.S. Cl.
 CPC .. H01M 10/0525 (2013.01); *H01M 2004/021* (2013.01); *H01M 2004/027* (2013.01); *H01M 2004/028* (2013.01)

(56) References Cited

U.S. PATENT DOCUMENTS

2009/0181301 A1 7/2009 Kim et al.
2014/0050978 A1* 2/2014 Otaka ................. H01M 10/052
 429/211
2014/0342242 A1* 11/2014 Egorov ............. H01M 10/0569
 429/332

FOREIGN PATENT DOCUMENTS

| JP | 2015-149250 A | 8/2015 |
| KR | 10-2000-0072955 A | 12/2000 |
| KR | 10-2004-0024842 A | 3/2004 |
| KR | 10-2005-0048935 A | 5/2005 |
| KR | 10-0719672 B1 | 5/2007 |
| KR | 10-2009-0063441 A | 6/2009 |
| KR | 10-2014-0018225 A | 2/2014 |

OTHER PUBLICATIONS

Xia, et al., "Thiophene derivatives as novel functional additives for high-voltage LiCoO2 operations in lithium ion batteries", Electrochimica Acta, vol. 151, pp. 429-436 (2015).
International Search Report for PCT/KR2017/005595.
Korean Office action dated Dec. 13, 2022.

* cited by examiner

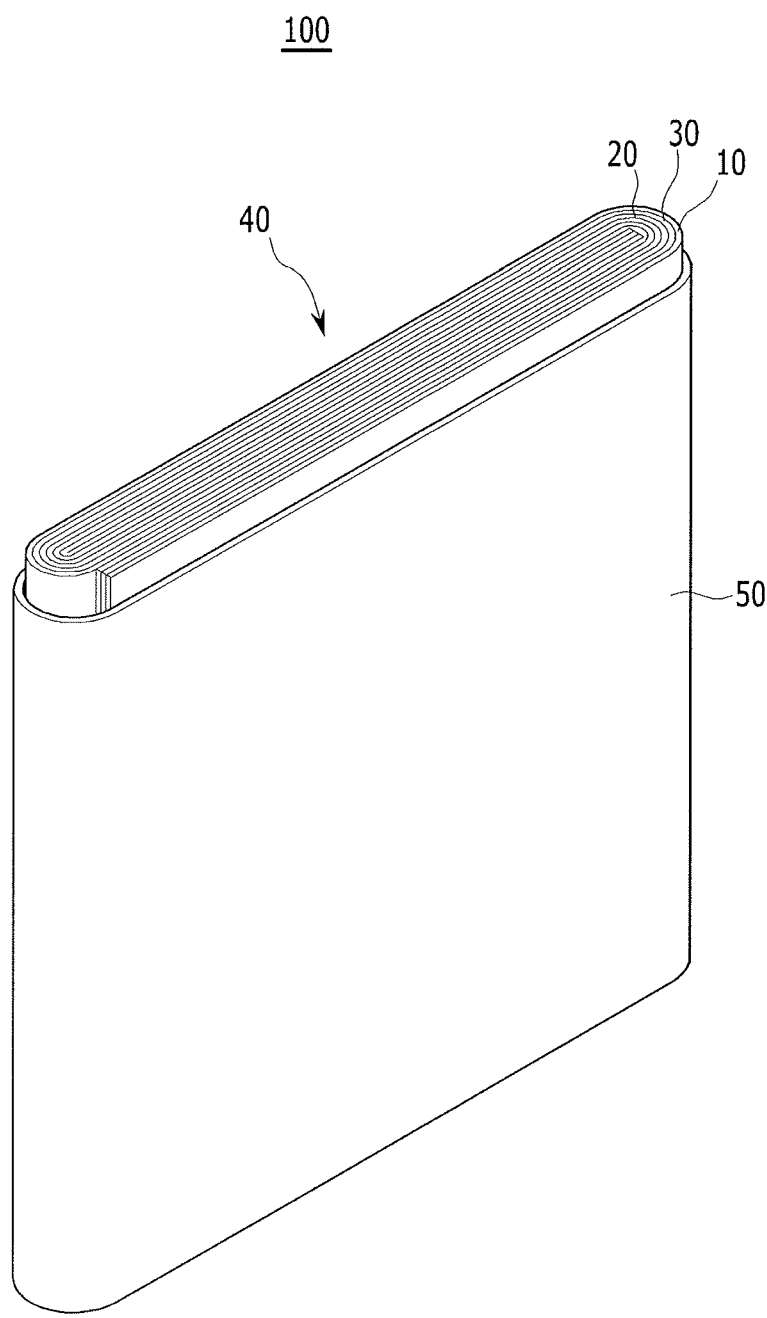
【Figure 1】

[Figure 2]
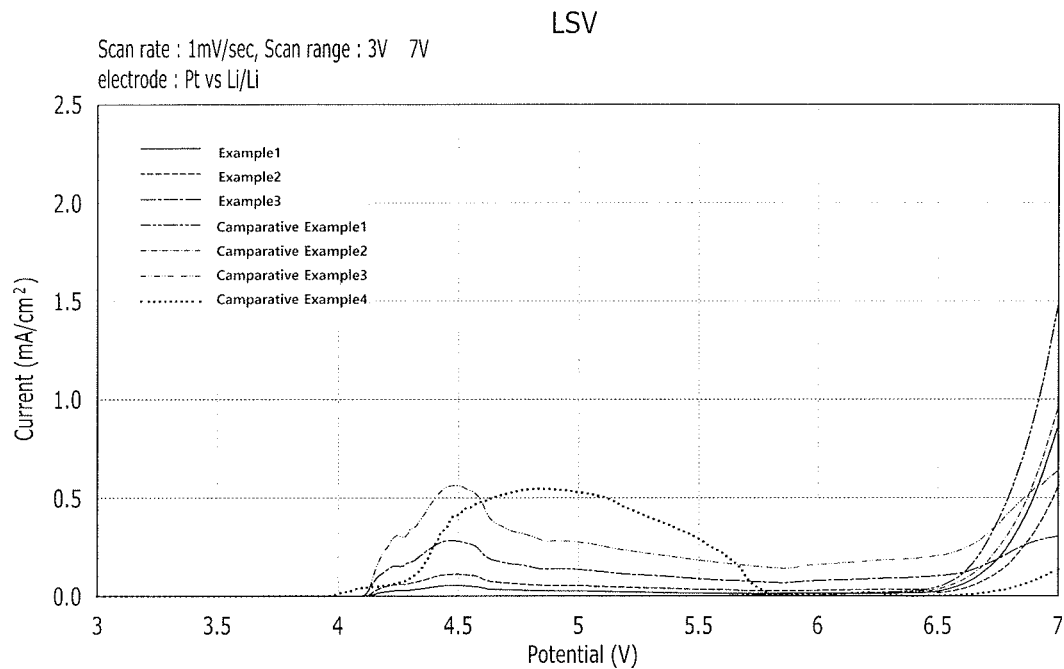
[Figure 3]
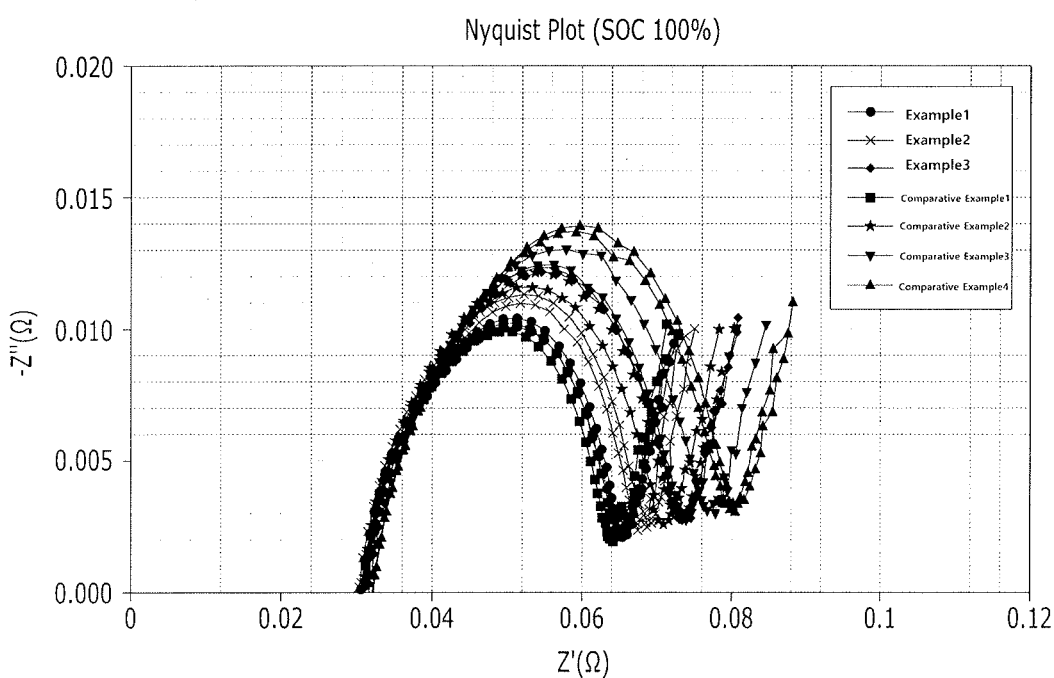

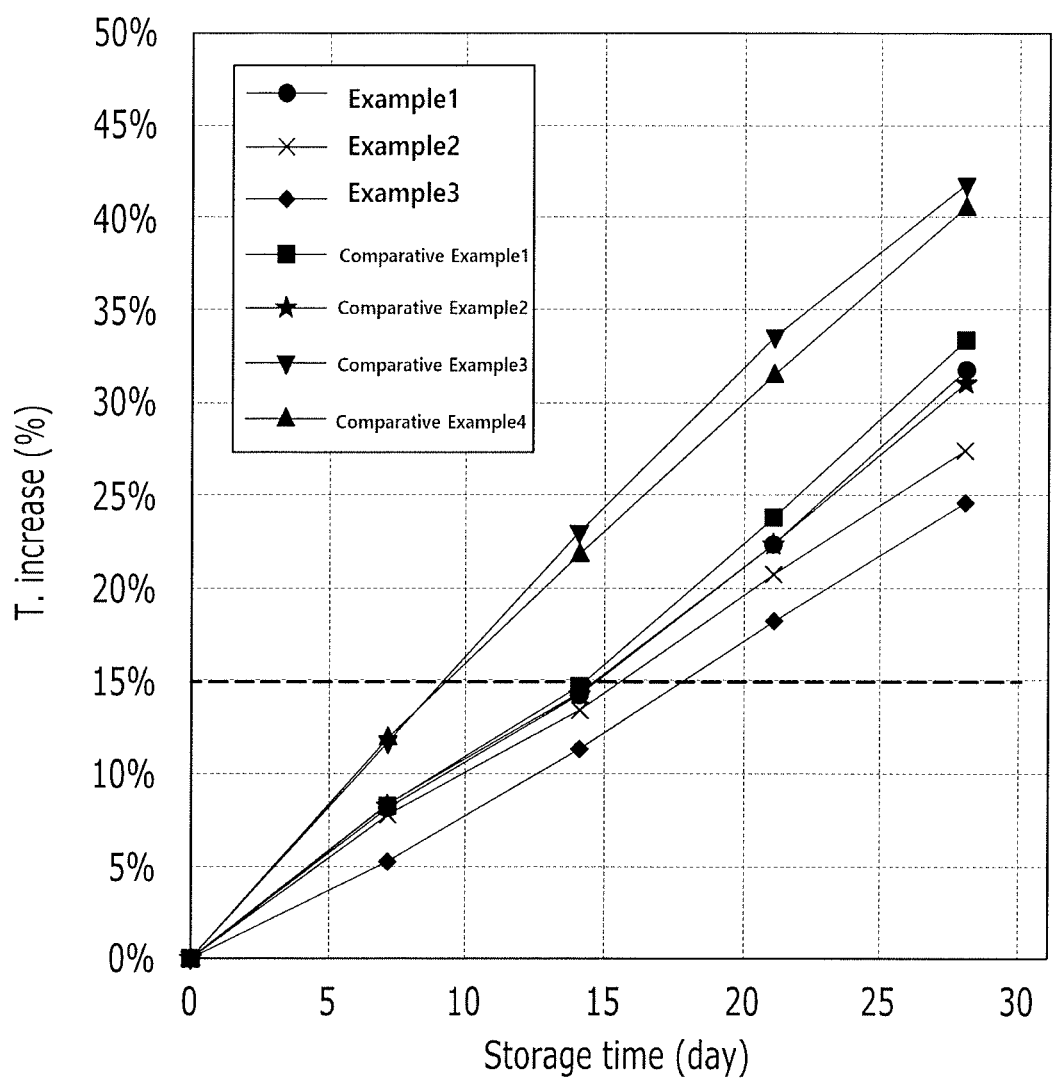
[Figure 4]

[Figure 5]
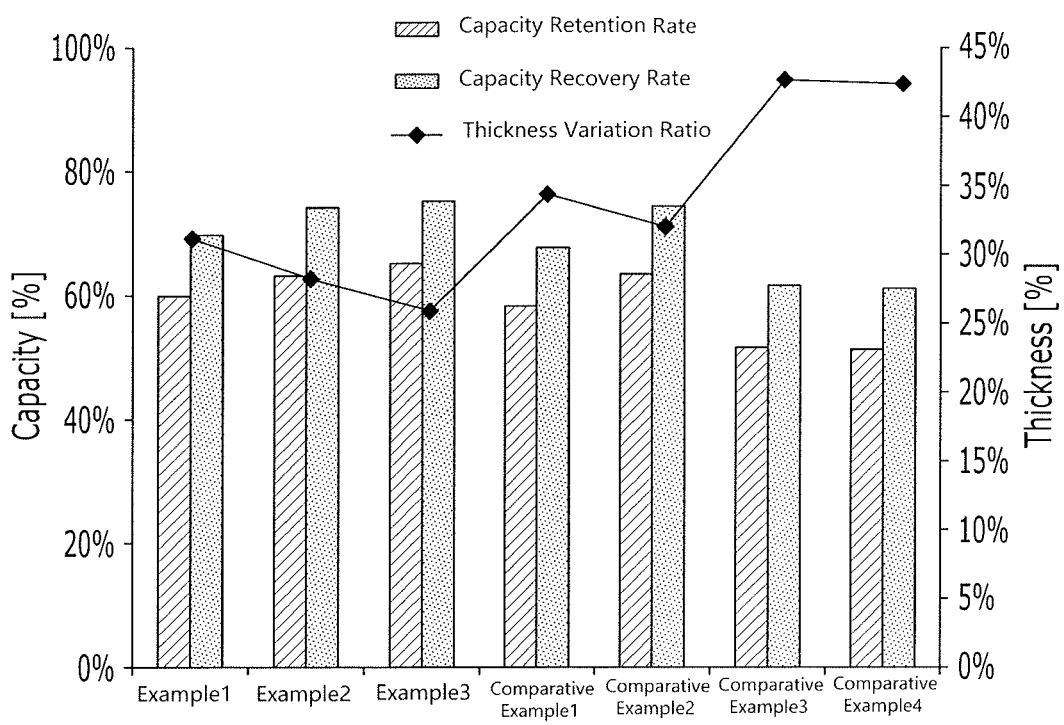

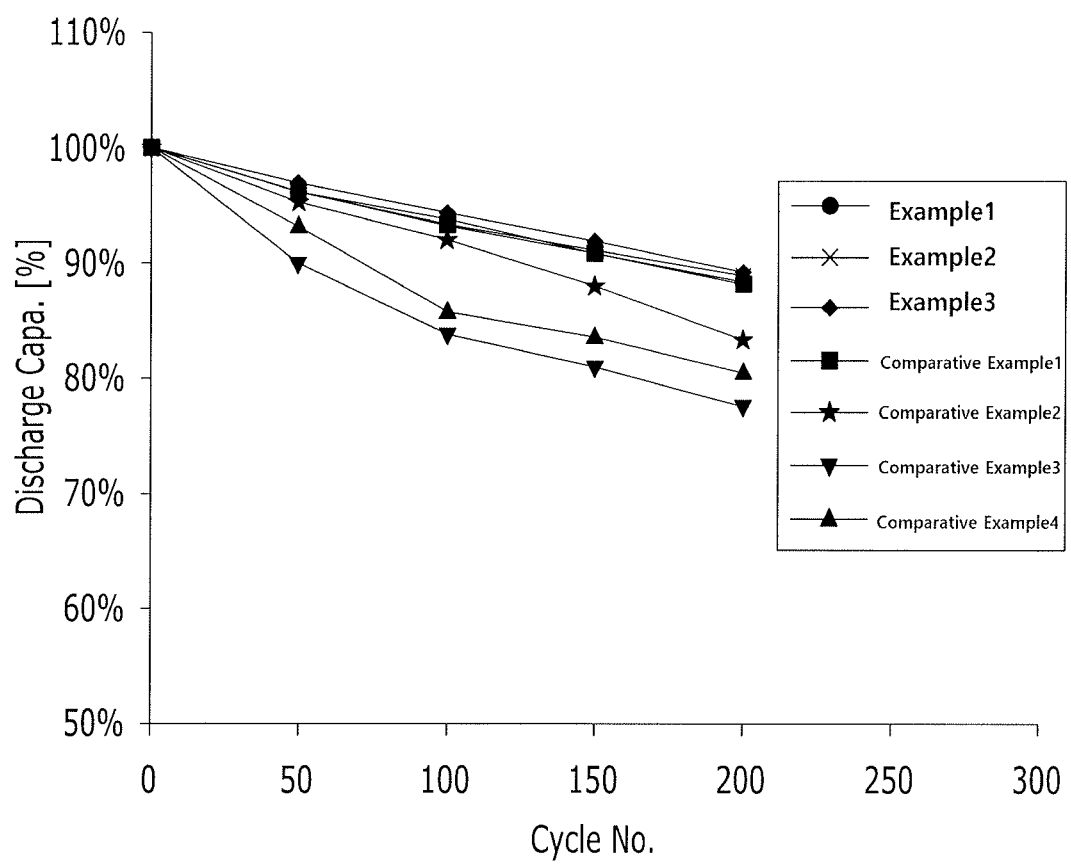
[Figure 6]

[Figure 7]
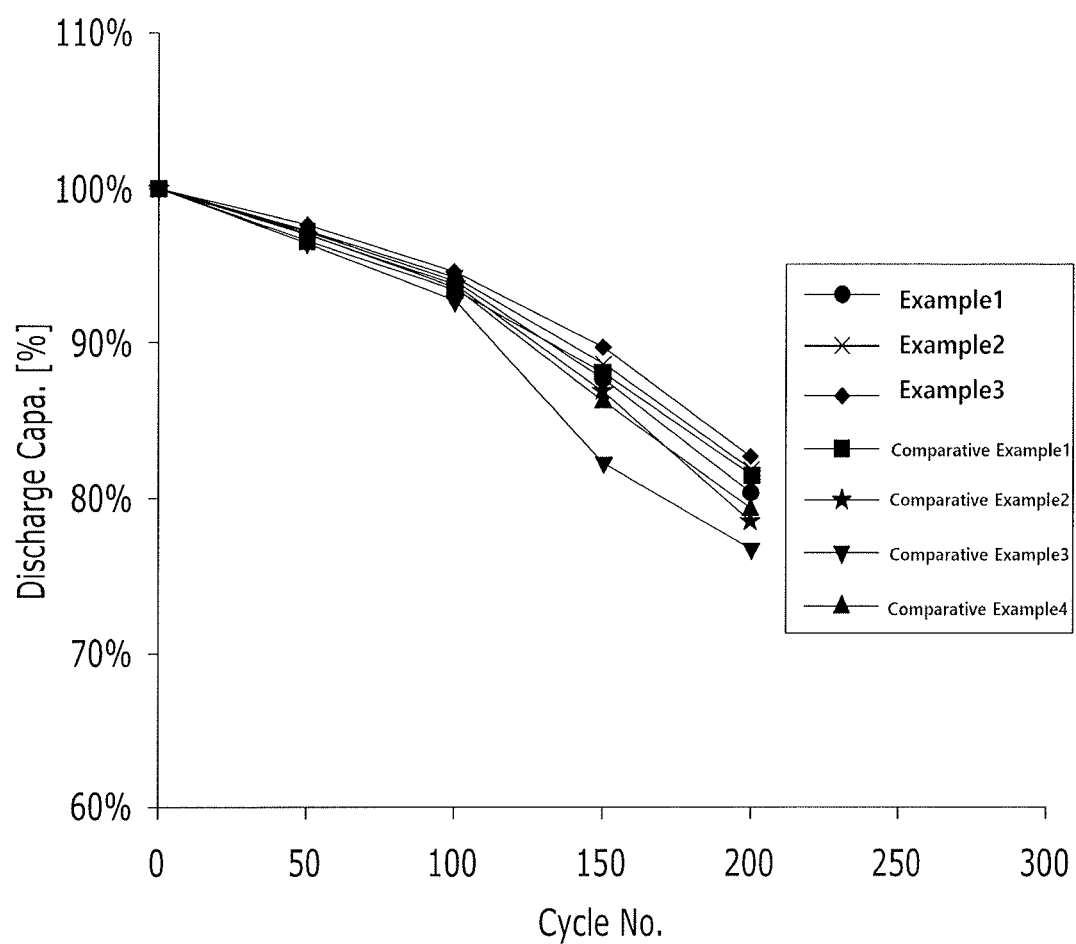

ELECTROLYTE FOR LITHIUM SECONDARY BATTERY, AND LITHIUM SECONDARY BATTERY CONTAINING SAME

CROSS-REFERENCE TO THE RELATED APPLICATION

This is the U.S. national phase application based on PCT Application No. PCT/KR2017/005595, filed May 29, 2017, which is based on Korean Patent Application No. 10-2016-0068953, filed Jun. 2, 2016, the entire contents of all of which are hereby incorporated by reference.

TECHNICAL FIELD

An electrolyte for a lithium secondary battery and a lithium secondary battery containing the same are disclosed.

BACKGROUND ART

A lithium secondary battery may be rechargeable and has three or more times higher energy density per unit weight than a conventional lead storage battery, nickel-cadmium battery, nickel hydrogen battery, nickel zinc battery, and the like, and may be chargeable at a high rate. Such a lithium secondary battery is commercially used for a laptop, a cell phone, an electric tool, an electric bike, and the like. Research on improvement of additional energy density has been actively made.

Generally, a lithium secondary battery includes a positive electrode, a negative electrode, a separator disposed between both of the electrodes, and an electrolyte. Attention to a method of improving performance of the lithium secondary battery by adding a small amount of a functional additive to the electrolyte without having a large influence on properties of the electrolyte is being paid. The electrolyte additive added in a small amount has various functions and is classified into an additive for a negative electrode and an additive for a positive electrode depending on its function. The electrolyte additive plays a role of forming a passivation film (a solid electrolyte Interface; SEI) generally preventing a direct contact of the electrolyte with an electrode active material. The electrolyte additive forming the passivation film on the surface of the electrodes is classified into an additive for a negative electrode helping SEI on the surface of graphite and an overcharge protection (OCP) agent forming a thick passivation film on the surface of the positive electrode.

As a demand on a high energy density lithium secondary battery for an electric vehicle and the like has recently been increased, research on a high-voltage positive active material is being made. However, research on the electrolyte additive for preventing an oxidation of an electrolyte solution on the interface of the high-voltage positive active material with an electrolyte is being insufficiently made.

In general, an electrolyte should have a wider potential window than a potential difference between positive and negative active materials to suppress a reaction of an electrolyte solution on the interface of an active material. However, when the high-voltage positive active material is used to increase energy density of a battery, the potential window of the electrolyte becomes narrower than that of the active material. Resultantly, a protective layer is formed to prevent the electrolyte from directly contacting the electrode active material and thus suppress decomposition of the electrolyte, through which battery capacity may be maintained during long cycles.

Since thermal durability of a battery is very important for battery safety as a battery is required of high capacity and a high voltage, an effort to secure the battery safety has been continuously made by using an additive to improve the thermal durability of the battery such as delay an ignition point, decrease a thickness change of the battery, or the like.

However, a conventional additive for improving high-temperature performance has a problem of having an influence on conductivity of lithium ions due to a resistance increase of the passivation film and thus deteriorating capacity, cycle-life characteristics and the like.

DISCLOSURE

Technical Problem

An embodiment of the present invention provides an electrolyte solution for a high-voltage lithium secondary battery, which forms a stable conductive polymer passivation film on a positive electrode during the charge to suppress a reaction on the interface of the positive electrode with the electrolyte solution and thus facilitate in and out of lithium ions, and in addition, a lithium secondary battery which is suppressed from gas generation under a high temperature condition and thus has excellent storage characteristics at a high temperature and improved high voltage and high temperature retention capacity and swelling prevention characteristics without deteriorating cycle-life characteristics.

Technical Solution

In an embodiment of the present invention, an electrolyte for a lithium secondary battery includes an organic solvent, a lithium salt and a compound of Chemical Formula 1, wherein the compound of Chemical Formula 1 is contained in an amount of 0.001 wt % or more and less than 0.1 wt %.

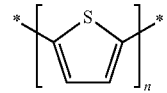

[Chemical Formula 1]

In Chemical Formula 1, n is one of integers of 3 to 10.
In Chemical Formula 1, n may be one of integers of 3 to 5.

The organic solvent may include a carbonate based solvent, an ester based solvent, an ether based solvent, a ketone based solvent, an alcohol based solvent, an aprotic solvent, or a combination thereof.

The lithium salt may include $LiPF_6$, $LiBF_4$, $LiSbF_6$, $LiAsF_6$, $LiN(SO_2CF_3)_2$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), $LiCl$, $LiI$, $LiB(C_2O_4)_2$, or a combination thereof.

A concentration of the lithium salt may be 0.1 M to 2.0 M.

In another embodiment of the present invention, a lithium secondary battery includes a negative electrode including a negative active material, a positive electrode including a positive active material and the electrolyte.

The lithium secondary battery may be operated at a high voltage of 4.4 V or greater.

Advantageous Effects

The electrolyte for a lithium secondary battery according to an embodiment forms a stable conductive polymer passivation film on the positive electrode during the charge and suppresses a reaction on the interface of the positive electrode to facilitate in and out of lithium ions, and a lithium secondary battery manufactured by applying the electrolyte is suppressed from gas generation at a high temperature and shows excellent high-voltage/high-temperature retention capacity and swelling prevention characteristics without deteriorating cycle-life characteristics.

DESCRIPTION OF THE DRAWINGS

FIG. 1 is a schematic view showing the structure of a lithium secondary battery according to an embodiment.

FIG. 2 is a graph showing linear sweep voltammetry with respect to electrolytes according to Examples and Comparative Examples.

FIG. 3 is a graph showing impedance of battery cells according to Examples and Comparative Examples.

FIG. 4 is a graph showing a thickness change of the battery cells according to Examples and Comparative Examples when stored at 60° C.

FIG. 5 is a graph showing capacity retention, a capacity recovery rate, and a cell thickness variation ratio of the battery cells according to Examples and Comparative Examples when stored at 60° C.

FIG. 6 is a graph showing room temperature cycle-life characteristics of the battery cells according to Examples and Comparative Examples.

FIG. 7 is a graph showing high temperature cycle-life characteristics of the battery cells according to Examples and Comparative Examples.

MODE FOR INVENTION

Hereinafter, embodiments of the present invention are described in detail. However, these embodiments are exemplary, the present invention is not limited thereto and the present invention is defined by the scope of claims.

In an embodiment of the present invention, an electrolyte for a lithium secondary battery includes an organic solvent, a lithium salt and a compound of Chemical Formula 1, wherein the compound of Chemical Formula 1 is contained in an amount of 0.001 wt % or more and less than 0.1 wt %.

[Chemical Formula 1]

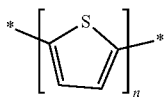

In Chemical Formula 1, n is one of integers of 3 to 10.

The compound of Chemical Formula 1 is a thiophene polymer of trimer or more as a conductive material forming an oxide film on a positive active material. The thiophene polymer has higher HOMO than a thiophene monomer or a thiophene dimer and thus may form a stable oxide film on the positive active material at a relatively low potential during the charge and much facilitate movement of lithium ions. The electrolyte may realize excellent performance of suppressing swelling when being placed at a high voltage and a high temperature without deteriorating discharge capacity, a cycle-life, and the like compared with a conventional electrolyte using a nitrile-based additive.

In Chemical Formula 1, n may be one integer of 3 to 10, for example, one integer of 3 to 9, one integer of 3 to 8, one integer of 3 to 7, one integer of 3 to 6, or one integer of 3 to 5.

The compound of Chemical Formula 1 may be included in an amount of greater than or equal to 0.001 wt % and less than 0.1 wt %, for example, greater than or equal to 0.001 wt % and less than or equal to 0.09 wt %, greater than or equal to 0.001 wt % and less than or equal to 0.08 wt %, greater than or equal to 0.001 wt % and less than or equal to 0.07 wt %, greater than or equal to 0.001 wt % and less than or equal to 0.06 wt %, greater than or equal to 0.001 wt % and less than or equal to 0.05 wt %, greater than or equal to 0.005 wt % and less than 0.1 wt %, or greater than or equal to 0.005 wt % and less than or equal to 0.09 wt % based on a total amount of the electrolyte for a lithium secondary battery. Herein, the compound of Chemical Formula 1 may form a very stable oxide film on a positive electrode, facilitate movement of lithium ions, and improve cycle-life characteristics, capacity characteristics at a high voltage and a high temperature, swelling-suppression characteristics, gas generation suppression characteristics, and the like. When the compound of Chemical Formula 1 is included in an amount of greater than or equal to 0.1 wt %, there may be a problem of deteriorating capacity, a cycle life, and the like due to an interface resistance increase.

The organic solvent may be a non-aqueous organic solvent and may include a carbonate based solvent, an ester based solvent, an ether based solvent, a ketone based solvent, an alcohol based solvent, or an aprotic solvent.

The carbonate based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like.

The ester based solvent may be methyl acetate, ethyl acetate, n-propyl acetate, dimethylacetate, methylpropionate, ethylpropionate, decanolide, mevalonolactone, caprolactone, and the like.

The ether based solvent may be dibutyl ether, tetraglyme, diglyme, dimethoxyethane, 2-methyltetrahydrofuran, tetrahydrofuran, and the like. The ketone based solvent may be cyclohexanone, and the like. In addition, the alcohol based solvent may be ethanol, isopropyl alcohol, and the like and the aprotic solvent may be nitriles, amides such as dimethyl formamide and the like, dioxolanes such as 1,3-dioxolane, and the like, sulfolanes, and the like.

The organic solvent may be used alone or in a mixture of two or more, and when the organic solvent is used in a mixture of two or more, the mixture ratio may be controlled in accordance with a desirable battery performance.

The carbonate-based solvent is prepared by mixing a cyclic carbonate and a linear (chain) carbonate. In this case, the cyclic carbonate and the linear carbonate may be mixed in a volume ratio of 1:1 to 1:9.

The organic solvent may further include an aromatic hydrocarbon-based organic solvent in addition to the carbonate based solvent. Herein, the carbonate based solvent and the aromatic hydrocarbon-based organic solvent may be mixed in a volume ratio of 1:1 to 30:1. Specific examples of the aromatic hydrocarbon-based organic solvent may be benzene, fluorobenzene, 1,2-difluorobenzene, 1,3-difluorobenzene, 1,4-difluorobenzene, 1,2,3-trifluorobenzene, 1,2, 4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2, 3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3, 5-triiodotoluene, xylene, and the like.

The electrolyte for a lithium secondary battery may further include vinylene carbonate or an ethylene-based carbonate compound in order to improve cycle life of a battery. Examples of the ethylene-based carbonate compound may be difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate.

The lithium salt is dissolved in an organic solvent, supplies a battery with lithium ions, basically operates the rechargeable lithium battery, and improves transportation of the lithium ions between positive and negative electrodes.

Examples of the lithium salt may be one or more selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein, x and y are natural numbers, for example an integer ranging from 1 to 20), LiCl, LiI, and $LiB(C_2O_4)_2$ (lithium bis (oxalato) borate: LiBOB).

A concentration of the lithium salt may desirably be within a range of 0.1 M to 2.0 M. When the lithium salt is included at the above concentration range, an electrolyte may have excellent performance and lithium ion mobility due to optimal electrolyte conductivity and viscosity.

The electrolyte according to an embodiment may be used in a battery operated at a high voltage of greater than or equal to 4.35 V, particularly 4.4V. In general, as for a battery of a high voltage of greater than or equal to 4.35 V, gas is in general more actively generated by a reaction of an active material with an electrolyte, but the electrolyte according to an embodiment may effectively suppress the gas generation even in a high-voltage battery and may improve cycle-life characteristics of a battery.

Another embodiment provides a lithium secondary battery including a positive electrode including a positive active material, a negative electrode including a negative active material, and the electrolyte.

The lithium secondary battery may be classified into a lithium ion battery, a lithium ion polymer battery, and a lithium polymer battery depending on kinds of a separator and an electrolyte. The lithium secondary battery may be classified to be cylindrical, prismatic, coin-type, pouch-type, and the like depending on its shape and may have any type such as a bulk type and a thin film type.

FIG. 1 is an exploded perspective view of a prismatic lithium secondary battery according to an embodiment. Referring to FIG. 1, a lithium secondary battery 100 includes an electrode assembly 40 formed by placing a separator 30 between a positive electrode 10 and a negative electrode 20 and winding the same, and the electrode assembly 40 housed in a case 50. The electrolyte solution (not shown) is impregnated in the positive electrode 10, the negative electrode 20, and the separator 30.

The positive electrode 10 includes a current collector and a positive active material layer formed on the current collector. The positive active material layer includes a positive active material, a binder, and optionally a conductive material.

The positive active material may be a compound being capable of intercalating and intercalating lithium. Specifically, it may include at least one composite oxide or composite phosphate of a metal of cobalt, manganese, nickel, aluminum, iron, or a combination thereof, and lithium. More specifically, it may be lithium cobalt oxide, lithium nickel oxide, lithium manganese oxide, lithium nickel cobalt manganese oxide, lithium nickel cobalt aluminum oxide, lithium iron phosphate, or a combination thereof.

The binder improves binding properties of positive active material particles with one another and with a current collector. Examples of the binder may be for example polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity and any electrically conductive material may be used as a conductive material unless it causes a chemical change. Examples of the conductive material may for example include a carbon-based material such as natural graphite, artificial graphite, carbon black, acetylene black, ketjen black, a carbon fiber, and the like, a metal-based material such as copper, nickel, aluminum, silver, and the like, a conductive polymer such as a polyphenylene derivative and the like, or a combination thereof.

The current collector may use aluminum, but is not limited thereto.

The negative electrode 20 includes a current collector and a negative active material layer disposed on the current collector, and the negative active material layer includes a negative active material, a binder, and optionally a conductive material.

The negative active material may be a material that reversibly intercalates/deintercalates lithium ions, a lithium metal, a lithium metal alloy, a material being capable of doping/dedoping lithium, or a transition metal oxide.

The material that reversibly intercalates/deintercalates lithium ions may be a carbon-based material and may be crystalline carbon, amorphous carbon or a mixture thereof. The crystalline carbon may be non-shaped, or sheet, flake, spherical, or fiber shaped graphite and may be natural graphite or artificial graphite. Examples of the amorphous carbon may be soft carbon or hard carbon, a mesophase pitch carbonized product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may be Si, a Si—C composite, $SiO_x$ ($0<x<2$), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, and not Si), Sn, $SnO_2$, Sn—R (wherein R is an element selected from an alkali metal, an alkaline-earth metal, a Group 13 element, a Group 14 element, a Group 15 element, a Group 16 element, a transition metal, a rare earth element, and a combination thereof, and not Sn), and the like, and at least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide includes vanadium oxide, lithium vanadium oxide, or lithium titanium oxide.

The binder improves binding properties of negative active material particles with one another and with a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber, an acrylonitrile-butadiene rubber, an acrylic rubber, a butyl rubber, a fluorine rubber, and a combination thereof. The polymer resin binder may be selected from polytetrafluoroethylene, polyethylene, polypropylene, an ethylene propylene copolymer, polyethyleneoxide, polyvinylpyrrolidone, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, and a combination thereof.

The conductive material is the same as described above.

The current collector may be selected from a copper foil, a nickel foil, stainless steel foil, a titanium foil, a nickel foam, a copper foam, a polymer substrate coated with a conductive metal, and a combination thereof.

The lithium secondary battery may further include a separator between the positive electrode 10 and the negative electrode 20. The separator includes polyethylene, polypropylene, or polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Hereinafter, preferable examples of the present invention are described in order to help understanding of the present invention. However, the following examples are provided for easy understanding of the present invention but do not limit the disclosure of the present invention.

Example 1

A 4.4V cell was manufactured by using $LiCoO_2$ as a positive electrode, artificial graphite as a negative electrode, and an electrolyte prepared by mixing ethylene carbonate, diethyl carbonate, and ethylpropionate in a volume ratio of 3:5:2 and adding 0.01 wt % of terthiophene and 1.15 M $LiPF_6$ of a lithium salt to the mixed solvent.

Example 2

A cell was manufactured according to the same method as Example 1 except for using 0.02 wt % of terthiophene in the electrolyte.

Example 3

A cell was manufactured according to the same method as Example 1 except for using 0.08 wt % of terthiophene in the electrolyte.

Comparative Example 1

A cell was manufactured according to the same method as Example 1 except for not using terthiophene in the electrolyte.

Comparative Example 2

A cell was manufactured according to the same method as Example 1 except for using 1 wt % of adiponitrile (AN) instead of the terthiophene in the electrolyte.

Comparative Example 3

A cell was manufactured according to the same method as Example 1 except for using 0.10 wt % of terthiophene in the electrolyte.

Comparative Example 4

A cell was manufactured according to the same method as Example 1 except for using 0.01 wt % of bithiophene (thiophene dimer) instead of the terthiophene in the electrolyte.

Evaluation 1: Evaluation of Linear Sweep Voltammetry (LSV)

LSV of the electrolytes according to Examples 1 to 3 and Comparative Examples 1 to 4 was measured by using a Pt electrode, and the results are shown in FIG. 2. Herein, a rate was 1 mV/sec, and a voltage range was 3 V to 7 V.

Referring to FIG. 2, the cells according to Examples 1 to 3 showed an oxidization decomposition around 4.2 V but were rather suppressed from the oxidization decomposition at a high voltage of greater than or equal to 6.5 V. The terthiophene was stably formed into a decomposition passivation film on the surface of an electrode and suppressed a decomposition reaction of an electrolyte solution thereon. On the contrary, the cell according to Comparative Example 3 a lot produced an oxidation current at a high voltage due to an oxidation decomposition of terthiophene itself.

On the other hand, as for the cell according to Comparative Example 4, bithiophene could be insufficiently decomposed but remained during the cell assembly process and thus decomposed during the storage at a high temperature or a cycle process and resultantly, had a negative influence on cell performance.

Evaluation 2: Evaluation of Interface Resistance

AC-impedance of each 4.4 V prismatic cell according to Examples 1 to 3 and Comparative Examples 1 to 4 was measured in an initial full charge state, and the results are shown in FIG. 3. The impedance was measured at room temperature by setting a frequency domain in a range of 0.01 to 100,000 Hz and an AC-amplitude at 5 mV.

Referring to FIG. 3, the cell including no high temperature additive according to Comparative Example 1 showed the lowest interface resistance, and the cell using a general nitrile-based additive according to Comparative Example 2 showed greater than or equal to 10% increased interface resistance. On the contrary, the cells including in a predetermined amount of terthiophene according to Examples 1 to 3 showed no large interface resistance change. The cell using terthiophene in an excessive amount according to Comparative Example 3 and the cell using bithiophene according to Comparative Example 4 showed much increased interface resistance and accordingly, may show a problem of deteriorating high rate capacity, a cycle life, and the like.

Evaluation 3: Evaluation of Cell Thickness Variations and Capacity Variations after Storage at 60° C.

A thickness change and recovery capacity of the cells according to Examples 1 to 3 and Comparative Examples 1 to 4 were measured, while allowed to stand at 60° C. for 21 days, and the results are shown in Table 1 and FIGS. 4 and 5. FIG. 4 is a graph showing a thickness variation ratio of each cell depending on time, and FIG. 5 is a graph showing capacity retention, a capacity recovery rate, and a thickness variation ratio of each cell.

TABLE 1

| | Initial capacity | Initial thickness | Thickness after being allowed to stand | Thickness variation ratio | Storage capacitance | Capacity retention | Recovery capacity | Capacity recovery rate |
|---|---|---|---|---|---|---|---|---|
| Example1 | 2915 | 5.17 | 6.75 | 30% | 1757 | 60.3% | 2034 | 69.8% |
| Example2 | 2911 | 5.18 | 6.61 | 28% | 1842 | 63.3% | 2163 | 74.3% |
| Example3 | 2905 | 5.19 | 6.50 | 25% | 1898 | 65.3% | 2188 | 75.3% |
| Comparative Example1 | 2911 | 5.18 | 6.91 | 34% | 1700 | 58.4% | 1977 | 67.9% |
| Comparative Example2 | 2907 | 5.19 | 6.80 | 31% | 1847 | 63.5% | 2168 | 74.6% |
| Comparative Example3 | 2905 | 5.19 | 7.35 | 42% | 1506 | 51.8% | 1796 | 61.8% |
| Comparative Example4 | 2910 | 5.25 | 7.42 | 41% | 1502 | 51.6% | 1790 | 61.5% |

Referring to Table 1 and FIGS. 4 and 5, Examples 1 to 3 showed a thickness variation ratio of less than or equal to 30% and thus were effectively suppressed from a thickness increase compared with Comparative Examples 1 to 4. In addition, Examples 1 to 3 showed capacity retention of greater than or equal to 60% and a capacity recovery rate of greater than or equal to 69% and thus improved capacity retention and capacity recovery rate compared with Comparative Examples 1 to 4.

Evaluation 4: Evaluation of Room Temperature Cycle-Life Characteristics

A capacity retention change of the 4.4 V prismatic cells according to Examples 1 to 3 and Comparative Examples 1 to 4 was measured at room temperature for 200 cycles, and the results are shown in Table 2 and FIG. 6.

TABLE 2

| | Room temperature cycle-life | | |
|---|---|---|---|
| | Initial capacity | 200 cy capacity | Capacity retention |
| Example1 | 2937 | 2598 | 88.4% |
| Example2 | 2918 | 2595 | 88.9% |
| Example3 | 2917 | 2902 | 89.2% |
| Comparative Example1 | 2917 | 2573 | 88.2% |
| Comparative Example2 | 2883 | 2516 | 87.3% |
| Comparative Example3 | 2900 | 2250 | 77.6% |
| Comparative Example4 | 2918 | 2351 | 80.6% |

Referring to Table 2 and FIG. 6, Examples 1 to 3 showed capacity retention of greater than or equal to 88% at room temperature after 200 cycles and thus much excellent cycle-life characteristics at room temperature compared with Comparative Examples 1 to 4.

Evaluation 5: Evaluation of High Temperature Cycle-Life Characteristics

A capacity retention change of the 4.4 V prismatic cells according to Examples 1 to 3 and Comparative Examples 1 to 4 was measured at 45° C. for 200 cycles, and the results are shown in Table 3 and FIG. 7.

TABLE 3

| | High-temperature cycle life | | |
|---|---|---|---|
| | Initial capacity | 200 cy capacity | Capacity retention |
| Example1 | 2910 | 2337 | 80.3% |
| Example2 | 2911 | 2378 | 81.7% |
| Example3 | 2910 | 2404 | 82.6% |
| Comparative Example1 | 2940 | 2395 | 81.5% |
| Comparative Example2 | 2911 | 2284 | 78.5% |
| Comparative Example3 | 2909 | 2231 | 76.7% |
| Comparative Example4 | 2901 | 2302 | 79.3% |

Referring to Table 3 and FIG. 7, Examples 1 to 3 showed capacity retention of greater than or equal to 80% at 45° C. after 200 cycles and thus much excellent high temperature cycle-life characteristics compared with Comparative Example 2 including a high temperature nitrile-based additive, Comparative Example 3 using terthiophene in an excessive amount, Comparative Example 4 using bithiophene, or the like.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. An electrolyte for a lithium secondary battery, wherein a positive active material of the lithium secondary battery includes lithium and cobalt, the electrolyte comprising:
   an organic solvent, a lithium salt, and a compound of Chemical Formula 1,
   wherein the organic solvent comprises a combination of a carbonate based solvent and an ester based solvent,
   wherein the compound of Chemical Formula 1 is contained in an amount of 0.001 wt % or more and less than 0.03 wt %:

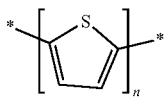

[Chemical Formula 1]

wherein, in Chemical Formula 1
n is one of the integers 3 to 10.

2. The electrolyte for a lithium secondary battery of claim 1, wherein in Chemical Formula 1, n is an integer of 3 to 5.

3. The electrolyte for a lithium secondary battery of claim 1, wherein the lithium salt comprises $LiPF_6$, $LiBF_4$, $LiSbF_6$, $LiAsF_6$, $LiN(SO_2CF_3)_2$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof.

4. The electrolyte for a lithium secondary battery of claim 1, wherein a concentration of the lithium salt is 0.1 M to 2.0 M.

5. A lithium secondary battery, comprising:
   a negative electrode including a negative active material,
   a positive electrode including a positive active material, the positive active material including lithium and cobalt, and
   the electrolyte for a lithium secondary battery of claim 1.

6. The lithium secondary battery of claim 5, wherein the lithium secondary battery is operated at a high voltage of 4.4 V or greater.

7. The electrolyte for a lithium secondary battery of claim 1, wherein n is an integer of 4 to 10.

8. An electrolyte for a lithium secondary battery, wherein a positive active material of the lithium secondary battery includes lithium and cobalt, the electrolyte comprising:
   an organic solvent, a lithium salt, and a compound of Chemical Formula 1,
   wherein the organic solvent comprises a combination of a carbonate based solvent and an ester based solvent,
   wherein the compound of Chemical Formula 1 is contained in an amount of 0.001 wt % or more and less than 0.08 wt %:

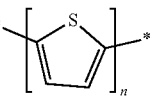

[Chemical Formula 1]

wherein, in Chemical Formula 1, n is an integer of 4 to 10.

* * * * *